US 7,096,347 B2

(12) United States Patent
Moore

(10) Patent No.: US 7,096,347 B2
(45) Date of Patent: Aug. 22, 2006

(54) PROCESSOR AND METHOD OF TESTING A PROCESSOR FOR HARDWARE FAULTS UTILIZING A PIPELINE INTERLOCKING TEST INSTRUCTION

(76) Inventor: Charles R. Moore, 8802 Royalwood Dr., Austin, TX (US) 78750

( * ) Notice: Subject to any disclaimer, the term of this patent is extended or adjusted under 35 U.S.C. 154(b) by 582 days.

(21) Appl. No.: 09/999,639

(22) Filed: Oct. 25, 2001

(65) Prior Publication Data

US 2003/0084273 A1 May 1, 2003

(51) Int. Cl.
*G06F 11/00* (2006.01)

(52) U.S. Cl. .......................................... 712/227; 712/23
(58) Field of Classification Search ................. 712/227, 712/208, 210, 214, 23, 24; 714/35
See application file for complete search history.

(56) References Cited

U.S. PATENT DOCUMENTS 5,475,852 A * 12/1995 Yoshida et al. ............... 714/34
5,708,594 A * 1/1998 Iwashita et al. ............... 703/21
6,058,470 A * 5/2000 Webb et al. ................. 712/208
6,732,297 B1 * 5/2004 Oura ............................ 714/33

* cited by examiner

*Primary Examiner*—Henry W. H. Tsai

(57) ABSTRACT

The instruction pipeline of a processor, which includes execution circuitry and instruction sequencing logic, receives a stream of instructions including a pipeline interlocking test instruction. The processor includes pipeline control logic that, responsive to receipt of the test instruction, interlocks the instruction pipeline as specified in the test instruction to prevent advancement of at least one first instruction in the instruction pipeline while permitting advancement of at least one second instruction in the instruction pipeline until occurrence of a release condition also specified by the test instruction. In response to the release condition, the pipeline control logic releases the interlock to enable advancement of said at least one instruction in the instruction pipeline. In this manner, selected instruction pipeline conditions, such a full queue or synchronization of instructions at certain pipeline stages, which are difficult to induce in a test environment through the execution of conventional instruction sets, can be tested.

19 Claims, 3 Drawing Sheets

PROCESSOR AND METHOD OF TESTING A PROCESSOR FOR HARDWARE FAULTS UTILIZING A PIPELINE INTERLOCKING TEST INSTRUCTION

BACKGROUND OF THE INVENTION

1. Technical Field

The present invention relates in general to data processing and, in particular, to functional verification of a processor. Still more particularly, the present invention relates to a processor and method of testing a processor for hardware faults through execution of a pipeline interlocking instruction.

2. Description of the Related Art

A typical superscalar microprocessor is a highly complex digital integrated circuit including, for example, one or more levels of cache memory for storing instructions and data, a number of execution units for executing instructions, instruction sequencing logic for retrieving instructions from memory and routing the instructions to the various execution units, and registers for storing operands and result data. Interspersed within and between these components are varies queues, buffers and latches for temporarily buffering instructions, data and control information.

As will be appreciated, at any one time the typical processor described above contains an enormous amount of state information, which can be defined as the aggregate of the instructions, data and control information present within the processor. Because of the size of the processor's state space, it is difficult to adequately test for combinations of internal conditions (e.g., full queues or buffers, certain instruction sequences, etc.) that can produce hardware functional errors by simulation testing or post-fabrication hardware testing utilizing conventional instruction streams. Such conventional methods of functional verification simply do not reliably induce or model "corner cases" (i.e., infrequently occurring combinations of internal states) that are likely to result in functional errors.

Thus, while complex circuitry such as processors can be tested for manufacturing faults, for example, utilizing conventional IEEE 1149.1 boundary scan testing, no method of performing full functional verification on a complex superscalar processor is currently available. Consequently, many conventional processors remain only partially tested, thus permitting hardware functional errors to remain undetected until after fabrication or release.

SUMMARY OF THE INVENTION

To address the above and other shortcomings in the art, the present invention provides a processor that utilizes a pipeline interlocking test instruction to detect processor hardware faults.

In accordance with one preferred embodiment of the present invention, the instruction pipeline of a processor, which includes execution circuitry and instruction sequencing logic, receives a stream of instructions including a pipeline interlocking test instruction. The processor includes pipeline control logic that, responsive to receipt of the test instruction, interlocks the instruction pipeline as specified in the test instruction to prevent advancement of at least one first instruction in the instruction pipeline while permitting advancement of at least one second instruction in the instruction pipeline until occurrence of a release condition also specified by the test instruction. In response to the release condition, the pipeline control logic releases the interlock to enable advancement of said at least one instruction in the instruction pipeline. In this manner, selected instruction pipeline conditions, such a full queue or synchronization of instructions at certain pipeline stages, which are difficult to induce in a test environment through the execution of conventional instruction sets, can be tested.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
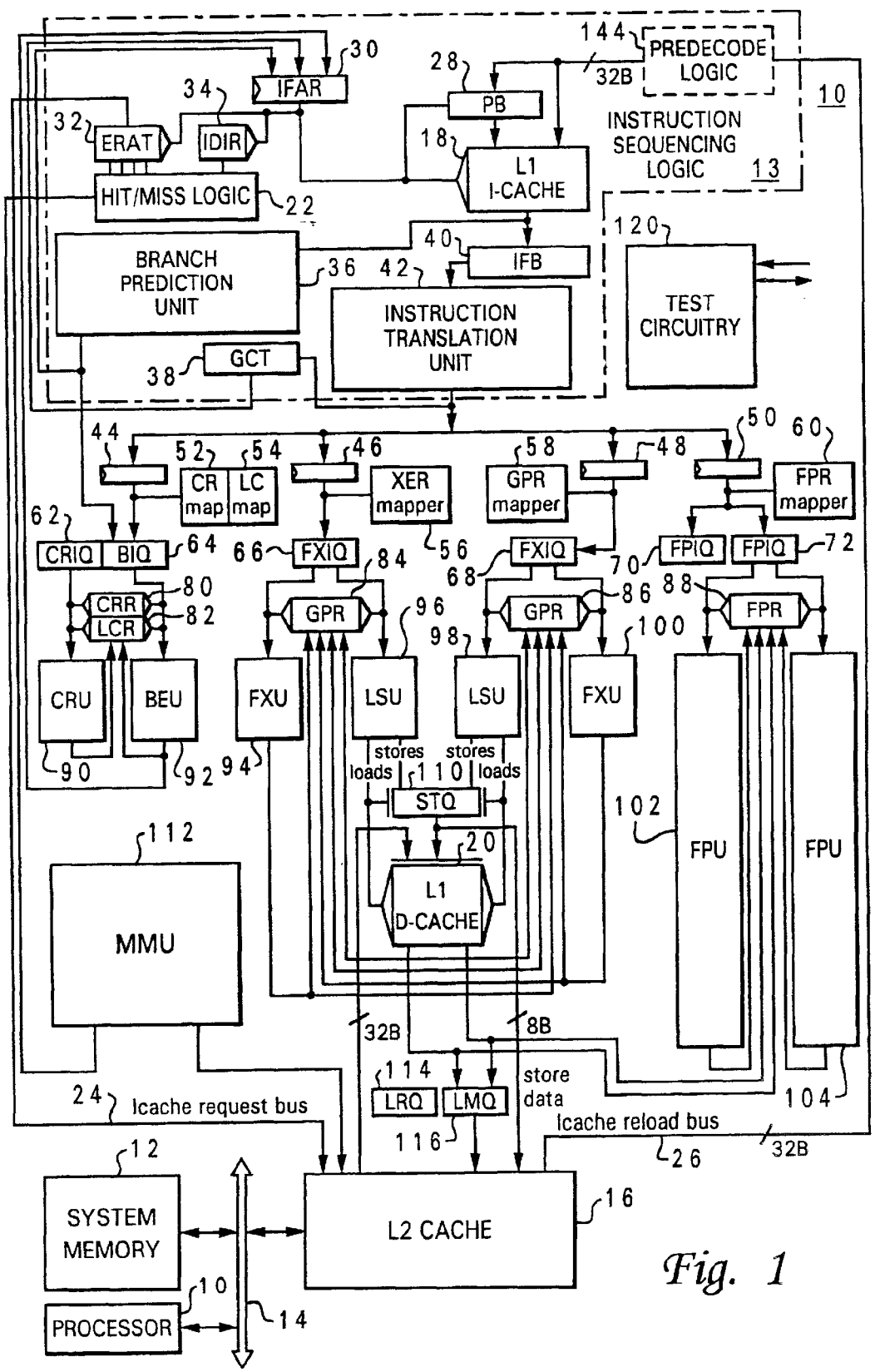
FIG. 1 depicts an illustrative embodiment of a data processing system with which the method and system of the present invention may advantageously be utilized.

With reference now to the figures and in particular with reference to FIG. 1, there is depicted a high level block diagram of an illustrative embodiment of a processor, indicated generally at 10, for processing instructions and data in accordance with the present invention. In particular, processor 10 supports improved verification by permitting hardware fault detection through the execution of pipeline interlocking test instructions.

Processor Overview

Processor 10 comprises a single integrated circuit superscalar processor, which, as discussed further below, includes various execution units, registers, buffers, memories, and other functional units that are all formed of digital integrated circuitry. As illustrated in FIG. 1, processor 10 maybe coupled to other devices, such as a system memory 12 and a second processor 10, by an interconnect fabric 14 to form a larger data processing system such as a workstation computer system. Processor 10 also includes an on-chip multi-level cache hierarchy including a unified level two (L2) cache 16 and bifurcated level one (L1) instruction (I)

and data (D) caches 18 and 20, respectively. As is well known to those skilled in the art, caches 16, 18 and 20 provide low latency access to cache lines corresponding to memory locations in system memory 12.

Instructions are fetched and ordered for processing by instruction sequencing logic 13 within processor 10. In the depicted embodiment, instruction sequencing logic 13 includes an instruction fetch address register (IFAR) 30 that contains an effective address (EA) indicating a cache line of instructions to be fetched from L1 I-cache 18 for processing. During each cycle, a new instruction fetch address may be loaded into IFAR 30 from one of three sources: branch prediction unit (BPU) 36, which provides speculative target path addresses resulting from the prediction of conditional branch instructions, global completion table (GCT) 38, which provides sequential path addresses, and branch execution unit (BEU) 92, which provides non-speculative addresses resulting from the resolution of predicted conditional branch instructions. If hit/miss logic 22 determines, after translation of the EA contained in IFAR 30 by effective-to-real address translation (ERAT) 32 and lookup of the real address (RA) in I-cache directory 34, that the cache line of instructions corresponding to the EA in IFAR 30 does not reside in L1 I-cache 18, then hit/miss logic 22 provides the RA to L2 cache 16 as a request address via I-cache request bus 24. Such request addresses may also be generated by prefetch logic within L2 cache 16 based upon recent access patterns. In response to a request address, L2 cache 16 outputs a cache line of instructions, which is loaded into prefetch buffer (PB) 28 and L1 I-cache 18 vial-cache reload bus 26, possibly after passing through optional predecode logic 144.

Once the cache line specified by the EA in IFAR 30 resides in L1 cache 18, L1 I-cache 18 outputs the cache line to both branch prediction unit (BPU) 36 and to instruction fetch buffer (IFB) 40. BPU 36 scans the cache line of instructions for branch instructions and predicts the outcome of conditional branch instructions, if any. Following a branch prediction, BPU 36 furnishes a speculative instruction fetch address to IFAR 30, as discussed above, and passes the prediction to branch instruction queue 64 so that the accuracy of the prediction can be determined when the conditional branch instruction is subsequently resolved by branch execution unit 92.

IFB 40 temporarily buffers the cache line of instructions received from L1 I-cache 18 until the cache line of instructions can be translated by instruction translation unit (ITU) 42. In the illustrated embodiment of processor 10, ITU 42 translates instructions from user instruction set architecture (UISA) instructions (e.g., PowerPC® instructions) into a possibly different number of internal ISA (IISA) instructions that are directly executable by the execution units of processor 10. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 38 to an instruction group, the members of which are permitted to be executed out-of-order with respect to one another. Global completion table 38 tracks each instruction group for which execution has yet to be completed by at least one associated EA, which is preferably the EA of the oldest instruction in the instruction group.

Following UISA-to-IISA instruction translation, instructions are dispatched in-order to one of latches 44, 46, 48 and 50 according to instruction type. That is, branch instructions and other condition register (CR) modifying instructions are dispatched to latch 44, fixed-point and load-store instructions are dispatched to either of latches 46 and 48, and floating-point instructions are dispatched to latch 50. Each instruction requiring a rename register for temporarily storing execution results is then assigned one or more registers within a register file by the appropriate one of CR mapper 52, link and count (LC) register mapper 54, exception register (XER) mapper 56, general-purpose register (GPR) mapper 58, and floating-point register (FPR) mapper 60.

The dispatched instructions are then temporarily placed in an appropriate one of CR issue queue (CRIQ) 62, branch issue queue (BIQ) 64, fixed-point issue queues (FXIQs) 66 and 68, and floating-point issue queues (FPIQs) 70 and 72. From issue queues 62, 64, 66, 68, 70 and 72, instructions can be issued opportunistically (i.e., possibly out-of-order) to the execution units of processor 10 for execution. The instructions, however, are maintained in issue queues 62–72 until execution of the instructions is complete and the result data, if any, are written back, in case any of the instructions needs to be reissued.

As illustrated, the execution units of processor 10 include a CR unit (CRU) 90 for executing CR-modifying instructions, a branch execution unit (BEU) 92 for executing branch instructions, two fixed-point units (FXUs) 94 and 100 for executing fixed-point instructions, two load-store units (LSUs) 96 and 98 for executing load and store instructions, and two floating-point units (FPUs) 102 and 104 for executing floating-point instructions. Each of execution units 90–104 is preferably implemented as an execution pipeline having a number of pipeline stages.

During execution within one of execution units 90–104, an instruction receives operands, if any, from one or more architected and/or rename registers within a register file coupled to the execution unit. When executing CR-modifying or CR-dependent instructions, CRU 90 and BEU 92 access the CR register file 80, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) register file 82 contains a count register (CTR), a link register (LR) and rename registers of each, by which BEU 92 may also resolve conditional branches to obtain a path address. General-purpose register files (GPRs) 84 and 86, which are synchronized, duplicate register files, store fixed-point and integer values accessed and produced by FXUs 94 and 100 and LSUs 96 and 98. Floating-point register file (FPR) 88, which like GPRs 84 and 86 may also be implemented as duplicate sets of synchronized registers, contains floating-point values that result from the execution of floating-point instructions by FPUs 102 and 104 and floating-point load instructions by LSUs 96 and 98.

After an execution unit finishes execution of an instruction, the execution notifies GCT 38, which schedules completion of instructions in program order. To complete an instruction executed by one of CRU 90, FXUs 94 and 100 or FPUs 102 and 104, GCT 38 signals the appropriate mapper, which sets an indication to indicate that the register file register(s) assigned to the instruction now contains the architected state of the register. The instruction is then removed from the issue queue, and once all instructions within its instruction group have completed, is removed from GCT 38. Other types of instructions, however, are completed differently.

When BEU 92 resolves a conditional branch instruction and determines the path address of the execution path that should be taken, the path address is compared against the speculative path address predicted by BPU 36. If the path addresses match, no further processing is required. If, however, the calculated path address does not match the predicted path address, BEU 92 supplies the correct path address to IFAR 30. In either event, the branch instruction can then be removed from BIQ 64, and when all other instructions within the same instruction group have completed, from GCT 38.

Following execution of a load instruction (including a load-reserve instruction), the effective address computed by executing the load instruction is translated to a real address by a data ERAT (not illustrated) and then provided to L1 D-cache 20 as a request address. At this point, the load operation is removed from FXIQ 66 or 68 and placed in load data queue (LDQ) 114 until the indicated load is performed. If the request address misses in L1 D-cache 20, the request address is placed in load miss queue (LMQ) 116, from which the requested data is retrieved from L2 cache 16, and failing that, from another processor 10 or from system memory 12.

Store instructions (including store-conditional instructions) are similarly completed utilizing a store queue (STQ) 110 into which effective addresses for stores are loaded following execution of the store instructions. From STQ 110, data can be stored into either or both of L1 D-cache 20 and L2 cache 16, following effective-to-real translation of the target address.

As will be appreciated by those skilled in the art from the foregoing description, the instruction handling circuitry of processor 10 can thus be considered an instruction pipeline in which instructions generally flow from cache memory to instruction sequencing logic 13, to issue queues 62–72, to execution units 90–104 and, for memory access instructions, to one of queues 110, 114, and 116, prior to completion and retirement from GCT 38.

Hardware Testing

Like any other electrical circuitry, the integrated circuitry of processor 10 described above is subject to hardware errors. In general, hardware errors are caused by either (1) fabrication process irregularities and environmental conditions or (2) undetected functional errors (i.e., design bugs).

In order to detect the first type of hardware errors, during the fabrication and packaging process, processor 10 will typically be subjected to a number of conventional environmental and electrical tests, including device tests and system (e.g., board) tests, in order to determine if processor 10 has suffered a hardware failure. To facilitate such testing, processor 10 may optionally include conventional test circuitry 120 (e.g., an IEEE Std. 1149.1-compliant boundary scan interface) coupled between the internal logic illustrated in FIG. 1 and the input/output (I/O) pins of the chip package.

As is well known to those skilled in the art, the IEEE Std. 1149.1 interface also defines a test access port (TAP) controller that, in response to various test instructions, places processor 10 in a TEST mode, which is defined herein as the state of a device where pins, test circuitry, and internal logic are configured for testing rather than for normal system operation. In TEST mode, the TAP controller may execute an instruction (e.g., EXTEST instruction) to test only the output pins or may alternatively execute test instructions (e.g., INTEST or RUNBIST) to test certain internal logic of processor 10. Further information regarding the IEEE Std. 1149.1 TAP controller and its associated test instructions may be found in "Standard Test Access Port and Boundary-Scan Architecture," Institute of Electrical and Electronics Engineers (May 21, 1990) and the 1149.1b-1994 Supplement, which are both incorporated herein by reference.

Although the device and board testing defined by IEEE Std. 1149.1 enables the detection of hardware faults caused by process irregularities and/or environmental conditions, such testing is limited in that only a limited set of hardware faults can be detected because usually only a small subset of the internal circuitry of a processor is interconnected to permit the propagation of test signals. Testing is also limited in that testing is only performed when the device under test (DUT) or board under test (BUT) is configured in the TEST mode. TEST mode operation cannot be guaranteed to reflect operational characteristics of the processor in its normal mode. Finally, and most importantly to the present invention, boundary scan testing cannot detect functional errors in the processor design.

The present invention provides an improved method of functional verification for a processor. In accordance with the present invention, functional verification is performed in a processor's normal mode of operation by inserting or designating one or more pipeline interlocking UISA or IISA test instructions in an instruction stream and then monitoring the processor's response to such test instructions.

Figure 2:
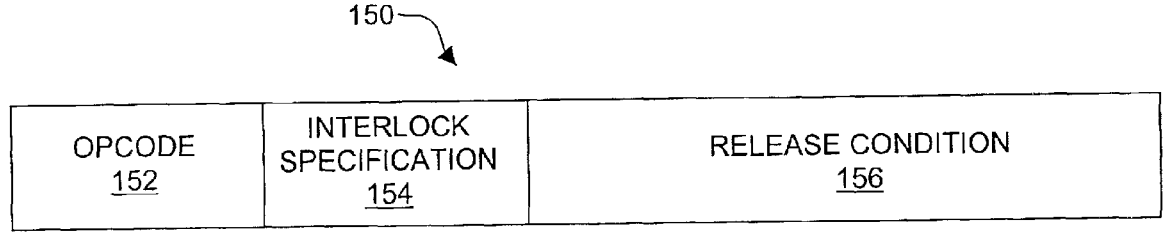
FIG. 2 illustrates an exemplary pipeline interlocking instruction in accordance with a preferred embodiment of the present invention.

Referring now to FIG. 2, there is illustrated an exemplary embodiment of a pipeline interlocking UISA or IISA instruction in accordance with a preferred embodiment of the present invention. As shown, instruction 150 preferably includes at least an operation code (opcode) field 152 that identifies instruction 150 as a pipeline interlocking instruction, an interlock specification field 154, and a release condition field 156.

Interlock specification field 154 is preferably implemented as a decoded bit field having a plurality of bits that are each associated with a respective one of the locations in the instruction pipeline at which instruction flow can be interlocked. For example, in the preferred embodiment of a processor illustrated in FIG. 1, the instruction pipeline can be interlocked at the bottom of IFB 40, at any of issue queues 62–72, at STQ 110, at LRQ 114 and LMQ116, and at GCT 38. During processing of instruction 150, the instruction pipeline will interlock at each location in the instruction pipeline indicated by a set bit in interlock specification field 154. To limit complexity in specifying interlock release conditions, it is preferable to limit the number of interlocks caused by each instruction 150 to one location in the instruction pipeline.

Release condition field 156 is a multi-bit field that indicates the release condition that causes the interlock(s) specified within interlock specification field 154 to be released. The release condition can be a single event, such as the occurrence of a queue full condition in the queue interlocked by instruction 150, or can comprise a combination of events. To facilitate testing of a variety of processor states, release condition field 156 preferably supports the specification of complex release conditions such as "A AND B OR C", where A, B, and C represent individual events within processor 10. This can be accomplished, for example, by providing within release condition field 156 three five-bit subfields that can each be utilized to specify any of a set of 32 events (including a null event) and two three-bit fields that can each be utilized to specify a respective one of the boolean operators (e.g., AND, OR, NOR, NOT, XOR, XNOR) linking the first and second and second and third events. The precedence of the specified boolean operations is preferably supported by implying parenthesis around the first and second events.

Based upon the format of instruction 150 of FIG. 2, those skilled in the art will appreciate that each instruction storage location in the instruction pipeline at which interlock is supported has associated control logic including instruction decoding logic that identifies instruction 150 as a pipeline interlocking instruction by reference to opcode field 152 and determines whether or not to interlock the instruction pipeline at that point based upon the setting of interlock specification field 154. The control logic further includes release logic that, based upon the setting of release condition field 156, releases the interlock in response to occurrence of the specified event(s).

Figure 3:
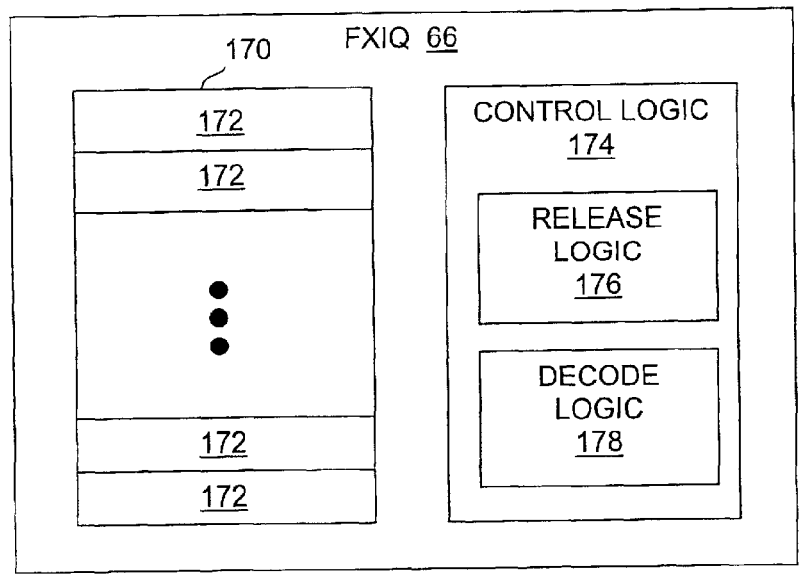
FIG. 3 depicts an illustrative embodiment of control logic that interlocks the instruction pipeline of the processor depicted in FIG. 1 in response to a pipeline interlocking instruction.

For example, FIG. 3 illustrates a more detailed block diagram of FXIQ 66 of processor 10 of FIG. 1. FXIQ 66 includes a storage area 170 containing a plurality of entries 172 for storing instructions to be executed by FXU 94 or LSU 96. Control logic 174 controls the loading of instructions into entries 172 and the issue and removal of instructions from entries 172. As shown, control logic 174 includes decode logic 178 and release logic 176.

Decode logic 178 decodes instructions within storage area 172 to determine if the instruction is a fixed point instruction to be executed by FXU 94, a memory access instruction to be executed by LSU 96, or a pipeline interlocking instruction. If decode logic 178 determines that an instruction is a pipeline interlocking instruction, decode logic 178 interlocks its associated portion of the instruction pipeline by holding the pipeline interlocking instruction within the bottom entry 172 in FXIQ 66 and preventing the issuance of at least one instruction following the pipeline interlocking instruction until release logic 176 detects occurrence of the release condition specified by the pipeline interlocking instruction. While the interlock is enforced, instructions preceding the pipeline interlocking instruction and optionally some instructions following (i.e., above) the pipeline interlocking instruction in the instruction stream continue to progress normally in the instruction pipeline.

Figure 4:
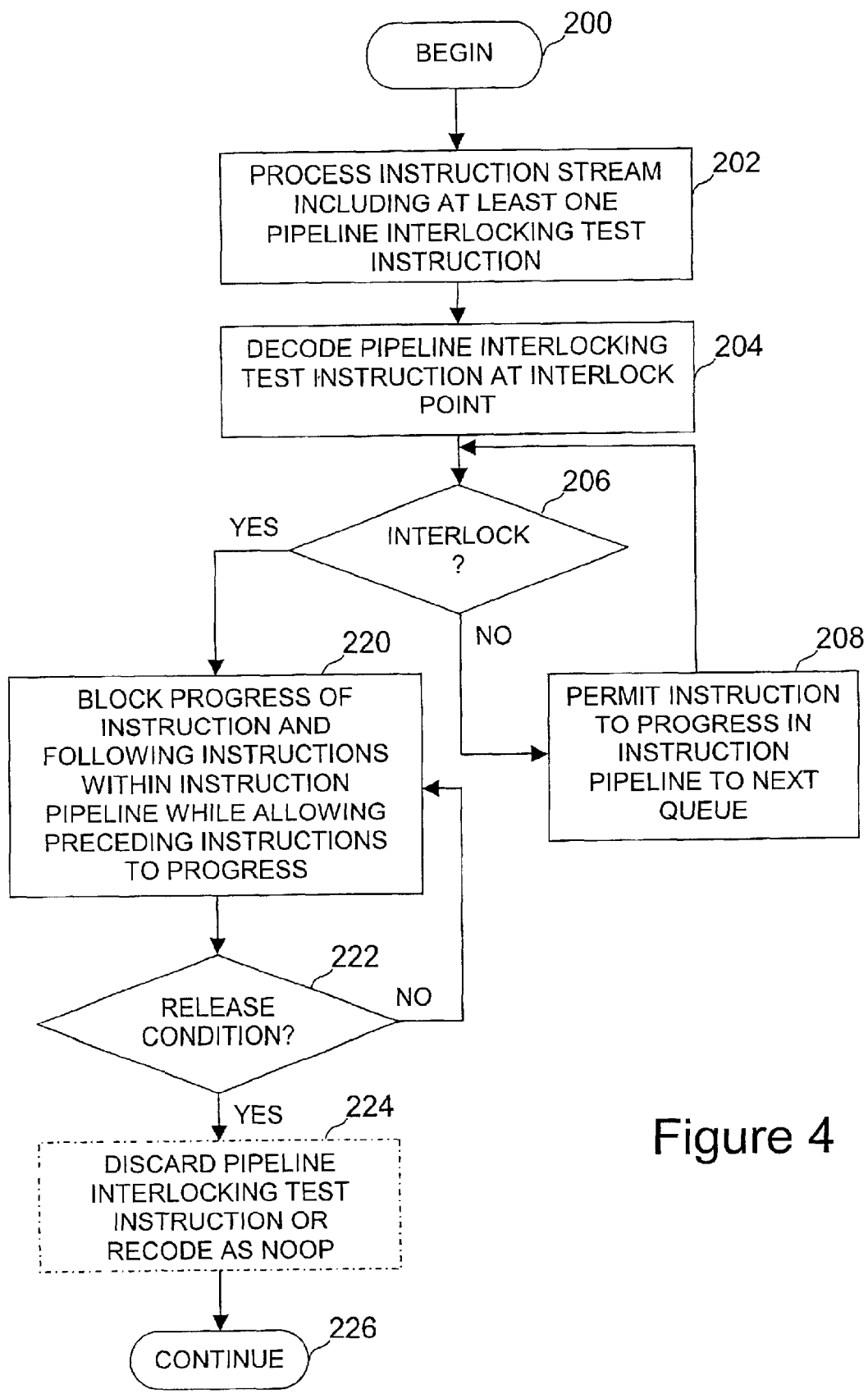
FIG. 4 is a high level logical flowchart of a method of testing a processor for hardware faults in accordance with a preferred embodiment of the present invention.

With reference now to FIG. 4, there is depicted a high level logical flowchart of an exemplary method of testing a processor for hardware faults in accordance with the present invention. As illustrated, the process begins at block 200 and thereafter proceeds to block 202, which illustrates processor 10 of FIG. 1 loading a stream of instructions from system memory 12 that includes one or more pipeline interlocking instructions in accordance with the present invention. The remainder of the instructions within the instruction stream preferably include a variety of UISA instruction types (e.g., branch instructions, memory access instructions, condition register instructions, arithmetic instructions, etc.) selected to exercise the various circuit blocks of processor 10. The instructions within the instruction stream are then processed by processor 10 in the manner described above with reference to FIG. 1.

The process shown in FIG. 4 then proceeds from block 202 to block 204, which illustrates decode logic, such as decode logic 178 of FIG. 3, examining the interlock specification field 154 of the pipeline interlocking instruction to determine whether or not to interlock the instruction pipeline. If the interlock specification field 154 of the pipeline interlocking instruction does not indicate an interlock at the current point in the instruction pipeline, the process passes to block 208, which illustrates the decode logic permitting the pipeline interlocking instruction to progress in the instruction pipeline. The process then returns to block 206, representing another evaluation of the interlock specification field 154 by decode logic at a subsequent point in the instruction pipeline.

In response to a determination at block 206 that the pipeline interlocking instruction specifies a pipeline interlock at its present location within the instruction pipeline, the process passes to block 220. Block 220 depicts control logic blocking progress of the pipeline interlocking instruction and at least one subsequent instruction while permitting at least instructions preceding the pipeline interlocking instruction in the instruction stream to progress in the instruction pipeline. Meanwhile, as shown at block 222, release logic monitors to detect occurrence of the release condition specified within release condition field 156, which release condition can be a single event (e.g., a queue full condition) or a combination of events. Importantly, the event or event combination comprising the release condition can include events upstream and/or downstream from the interlock in the instruction pipeline. For example, if an interlock is enforced at FXIQ 66, the release condition may comprise IFB 40 becoming full (an upstream event) and/or LRQ 114 becoming empty (a downstream event).

The process iterates at blocks 220 and 222 until the release condition is detected. In response to detection of the release condition, the control logic may optionally discard the pipeline interlocking instruction or recode it as a loop instruction, as illustrated at block 224. Thereafter, processing of the instruction stream continues at block 226.

As has been described, the present invention provides an improved method and system for testing processor hardware for faults through the execution of an instruction stream including one or more pipeline interlocking instructions that create temporary blockages for at least some instructions at selected locations within the instruction pipeline. By processing an instruction stream in this manner, a set of test output data resulting from processing the instruction stream is generated. This set of output data can then be compared to an expected result set to identify at which point(s) in the instruction stream, if any, hardware faults within the processor were manifested. Such hardware faults can result from stressing instruction processing circuitry above the interlock by backing up the instruction pipeline above the interlock and/or by "starving" instruction processing circuitry below the interlock.

It should also be appreciated that the present invention is applicable not only to processor hardware verification, but also to software debugging. That is, by judiciously inserting pipeline interlocking instructions within an instruction stream to be debugged, a programmer can isolate the execution of selected instructions to determine the cause of a software error. For example, to isolate a particular instruction sequence, a programmer may insert a pipeline interlocking instruction that interlocks the instruction pipeline at IFB 40 into the instruction stream following a "suspect" sequence of instructions. By specifying within the pipeline interlocking instruction that the interlock is to be released when the instruction immediately preceding the interlocking instruction has been completed by GCT 38, the "suspect" instruction sequence can be isolated from interaction with other instructions, which may otherwise be executed by processor 10 out-of-order with respect to instructions within the "suspect sequence" thus complicating debugging.

While the invention has been particularly shown and described with reference to a preferred embodiment, it will be understood by those skilled in the art that various changes in form and detail may be made therein without departing from the spirit and scope of the invention. For example, the present invention is not limited to a particular processor architecture or to processor architectures that utilize instruction translation, but is applicable to any processor architecture. Similarly, it should be appreciated that the present invention encompasses not only a processor that supports hardware verification and a method for performing such hardware verification, but also program products embodying verification software including pipeline interlocking instructions in accordance with the present invention.

What is claimed is:

1. A processor, comprising:
   an instruction pipeline including:
   execution circuitry; and
   instruction sequencing logic that provides a stream of instructions including a test instruction for execution; and
   pipeline control logic that, responsive to receipt of the test instruction, interlocks the instruction pipeline at a location within the instruction pipeline specified by the test instruction to prevent advancement of at least one first instruction in the instruction pipeline while permitting advancement of at least one second instruction in the instruction pipeline until a release condition occurs and, in response to the release condition, releases the interlock to enable advancement of said at least one first instruction in the instruction pipeline.

2. The processor of claim 1, wherein said pipeline control logic recodes said test instruction as a no-op instruction in response to the release condition.

3. The processor of claim 1, wherein said instruction pipeline comprises an instruction fetch buffer controlled by said pipeline control logic, wherein said pipeline control logic interlocks the instruction pipeline at said instruction fetch buffer.

4. The processor of claim 1, wherein said instruction pipeline comprises an issue queue controlled by said pipeline control logic, wherein said pipeline control logic interlocks the instruction pipeline at said issue queue.

5. The processor of claim 1, wherein said instruction pipeline comprises a completion table controlled by said pipeline control logic, wherein said pipeline control logic interlocks the instruction pipeline at said completion table.

6. The processor of claim 1, wherein said instruction pipeline comprises a queue for memory access operations controlled by said pipeline control logic, wherein said pipeline control logic interlocks the instruction pipeline at said queue for memory access operations.

7. The processor of claim 1, said pipeline control logic including release logic that detects said release condition in response to occurrence of a plurality of events within the processor.

8. The processor of claim 1, wherein said pipeline control logic comprises decode logic that decodes the test instruction to determine at which of a plurality of possible locations within the instruction pipeline said test instruction specifies that an interlock is to be enforced.

9. A data processing system, comprising:
   a processor in accordance with claim 1;
   a system interconnect coupled to said processor; and
   a system memory coupled to said system interconnect.

10. A processor, comprising:
    an instruction pipeline including:
    execution circuitry; and
    instruction sequencing logic that provides a stream of instructions including a test instruction for execution; and
    pipeline control logic that, responsive to receipt of the test instruction, interlocks the instruction pipeline to prevent advancement of at least one first instruction in the instruction pipeline while permitting advancement of at least one second instruction in the instruction pipeline until a release condition occurs and, in response to the release condition, releases the interlock to enable advancement of said at least one first instruction in the instruction pipeline;
    wherein said release condition is a selected release condition among a plurality of selectable release conditions, and wherein said pipeline control logic including release logic that monitors to detect said selected release condition in response to said test instruction specifying said selected release condition in a release condition field.

11. A data processing system, comprising:
    a processor in accordance with claim 10;
    a system interconnect coupled to said processor; and
    a system memory coupled to said system interconnect.

12. A method, comprising:
    receiving within the instruction pipeline of a processor a stream of instructions including a test instruction; and
    in response to detection of the test instruction, interlocking the instruction pipeline at a location within the instruction pipeline specified by the test instruction to prevent advancement of at least one first instruction in the instruction pipeline while permitting advancement of at least one second instruction in the instruction pipeline until a release condition occurs; and
    in response to the release condition, releasing the interlock to enable advancement of said at least one first instruction in the instruction pipeline.

13. The method of claim 12, and further comprising recoding said test instruction as a no-op instruction in response to the release condition.

14. The method of claim 12, wherein said interlocking comprises temporarily blocking advancement of said at least one first instruction within a storage unit of the processor.

15. The method of claim 12, and further comprising detecting said release condition in response to occurrence of a plurality of events within the processor.

16. A method, comprising:

receiving within the instruction pipeline of a processor a stream of instructions including a test instruction; and in response to detection of the test instruction, interlocking the instruction pipeline to prevent advancement of at least one first instruction in the instruction pipeline while permitting advancement of at least one second instruction in the instruction pipeline until a release condition specified by the test instruction occurs; and in response to the release condition specified by the test instruction occurring, releasing the interlock to enable advancement of said at least one first instruction in the instruction pipeline.

17. A program product, comprising:

a test program containing a stream of instructions, said stream of instructions including at least one test instruction that causes a processor to interlock its instruction pipeline to prevent advancement of at least one first instruction in the instruction pipeline while permitting advancement of at least one second instruction in the instruction pipeline until a release condition occurs and, responsive to the release condition, to release the interlock to enable advancement of said at least one first instruction in the instruction pipeline; and a computer usable medium in which said test program is encoded;

wherein said test instruction includes a interlock specification field that specifies at which of a plurality of locations within the instruction pipeline of the processor to enforce the interlock.

18. A program product, comprising:

a test program containing a stream of instructions, said stream of instructions including at least one test instruction that causes a processor to interlock its instruction pipeline to prevent advancement of at least one first instruction in the instruction pipeline while permitting advancement of at least one second instruction in the instruction pipeline until a release condition occurs and, responsive to the release condition, to release the interlock to enable advancement of said at least one first instruction in the instruction pipeline; and a computer usable medium in which said test program is encoded; and wherein said test instruction includes a release condition field that specifies said release condition.

19. The program product of claim 18, said release condition comprising a plurality of events within the processor.

* * * * *